United States Patent [19]

Cimetta et al.

[11] Patent Number: 5,758,377
[45] Date of Patent: Jun. 2, 1998

[54] CLOTHES WASHING MACHINE WITH RINSING CYCLES USING SMALL AMOUNTS OF WATER

[75] Inventors: Silvano Cimetta, Treviso; Piero Babuin, Pordenone, both of Italy

[73] Assignee: Electrolux Zanussi Elettrodomestici S.p.A., Pordenone, Italy

[21] Appl. No.: 756,007

[22] Filed: Nov. 25, 1996

[30] Foreign Application Priority Data

Dec. 6, 1995 [IT] Italy ................. PN95A0064

[51] Int. Cl.⁶ .................... D06F 21/04; D06F 23/02
[52] U.S. Cl. .................. 8/158; 8/159; 68/12.12; 68/58; 68/207
[58] Field of Search .............. 8/158, 159; 68/12.12, 68/53, 58, 207

[56] References Cited

U.S. PATENT DOCUMENTS

| | | | |
|---|---|---|---|
| 2,895,320 | 7/1959 | Long | 68/58 |
| 3,387,310 | 6/1968 | Marshall | 8/158 |
| 3,388,410 | 6/1968 | Marshall | 8/158 |
| 4,794,661 | 1/1989 | Durazzani | 8/158 |
| 5,167,722 | 12/1992 | Pastryk et al. | 8/159 X |
| 5,469,719 | 11/1995 | Imai et al. | 68/12.12 X |
| 5,507,053 | 4/1996 | Mueller et al. | 8/159 X |
| 5,606,877 | 3/1997 | Hashimoto | 68/12.12 X |

*Primary Examiner*—Philip R. Coe
*Attorney, Agent, or Firm*—Pearne, Gordon, McCoy & Granger LLP

[57] ABSTRACT

A clothes washing machine is provided with a wash tub and a perforated drum arranged therein. A recirculating pump pumps liquid contained in a conduit provided with a pressure switch in its lower portion, arranged under the tub, and directed again toward the interior of the drum. The machine is capable, at least in a rinse cycle, of filling a predetermined amount of water into the tub, to let the recirculating pump operate for a definite period of time so as to enable the water to be fully pumped into the drum. At the same time, the drum is caused to rotate at a low speed. A signal starting spin-extraction for a pre-defined period of time enables a lower water level to be restored in the tub. The initially filled-in water is let into the tub in such an amount that the upper edge of the liquid in the tub eventually remains constantly below the lower edge of the drum, such an alternate sequence of recirculation and spin-extraction phases being repeated several times.

16 Claims, 2 Drawing Sheets

CLOTHES WASHING MACHINE WITH RINSING CYCLES USING SMALL AMOUNTS OF WATER

BACKGROUND OF THE INVENTION

The present invention relates to a clothes washing machine, in particular of the household type, provided with means to recirculate liquid collecting in the bottom portion of the tub. The machine provides considerable savings in the usage of fresh water in the rinsing phases.

The present invention applies equally well to both front-loading and top-loading types of washing machines, although the accompanying drawings illustrate, by mere way of example, a front-loading machine.

It is largely known that one of the major issues currently dealt with by design engineers and manufacturers of clothes washing machines, in particular those for household use, relates to the ways in which savings can be obtained in the usage of fresh water from the water supply mains. Household washing machines commonly have total water usage from approximately 50 liters to approximately 70 liters to handle a washload of approximately 5 kg.

Such usage is due to the number of washing and rinsing cycles that are included in the regular washing programs. Particularly spendthrift among these cycles, in terms of water usage, are the rinsing cycles since there are generally three or more. Also, there is a general tendency to maximize the actual amounts of water filled in to perform these cycles owing to the basic consideration that rinsing efficiency can be regarded as being in a direct relation to the amount of water used.

In order to reduce water usage in general, various types of washing machines have been proposed, including the so-called "recirculating" machines, wherein the liquid in the tub is moved by a pump or similar means to be sprayed again on to the washload. Other machines are provided with a recovery reservoir that is used to recover the liquid which would otherwise be discharged from the machine. Using such a recovery reservoir, the liquid is reused in one or more of the subsequent operation phases of the machine, preferably during a subsequent washing program. Preferably, the quality of the liquid that must be filled into the tub is compatible with the quality of the previously recovered liquor stored in the reservoir.

However, the water saving effect that can be reached in recirculating machines is basically confined to the washing phases of the process. Performing a recirculation of the liquid leaves the rinsing process substantially unaltered. Furthermore, the utilization of a recovery reservoir, with the various component parts that must be associated therewith in view of enabling it to operate regularly and correctly, calls for a substantial redesign of the machine. Such machines are more complex, expensive and, above all, much more susceptible to the formation of degenerative processes (fermentation, bad or offensive smells, etc.) in the mass of recovered liquid, which are to be strictly avoided.

BRIEF SUMMARY OF THE INVENTION

It therefore would be desirable, and is a purpose of the present invention, to provide a clothes washing machine which is capable of bringing about a significant water saving effect in the rinsing phases without requiring any major constructional modifications or redesign of the machines and/or the manufacturing processes, while eliminating the need for recovery reservoirs and associated operation means to be provided.

BRIEF DESCRIPTION OF THE SEVERAL VIEWS OF THE DRAWING

The invention will be more readily understood from the description which is given below by way of non-limiting example with reference to the accompanying drawings, in which.

DESCRIPTION OF THE INVENTION

Figure 1:
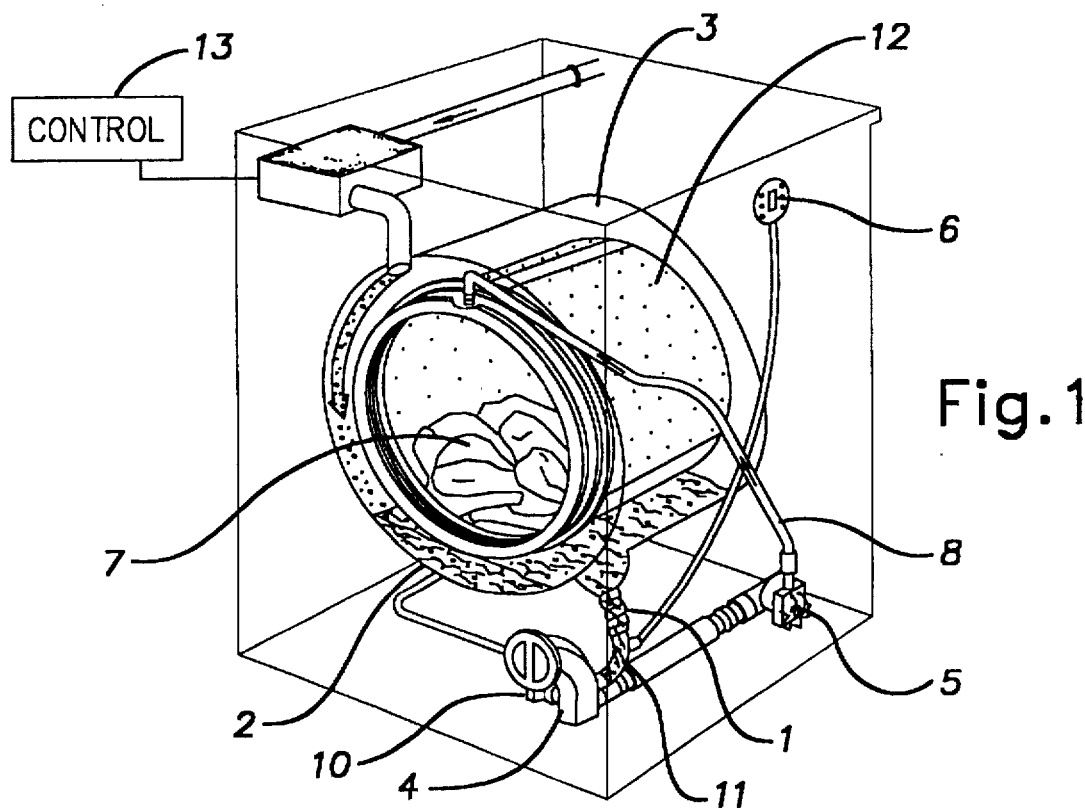
FIGS. 1 and 2 are schematical views of a first phase of filling water into the tub and a second phase of liquid circulating, respectively, in a machine according to the present invention.
Figure 2:
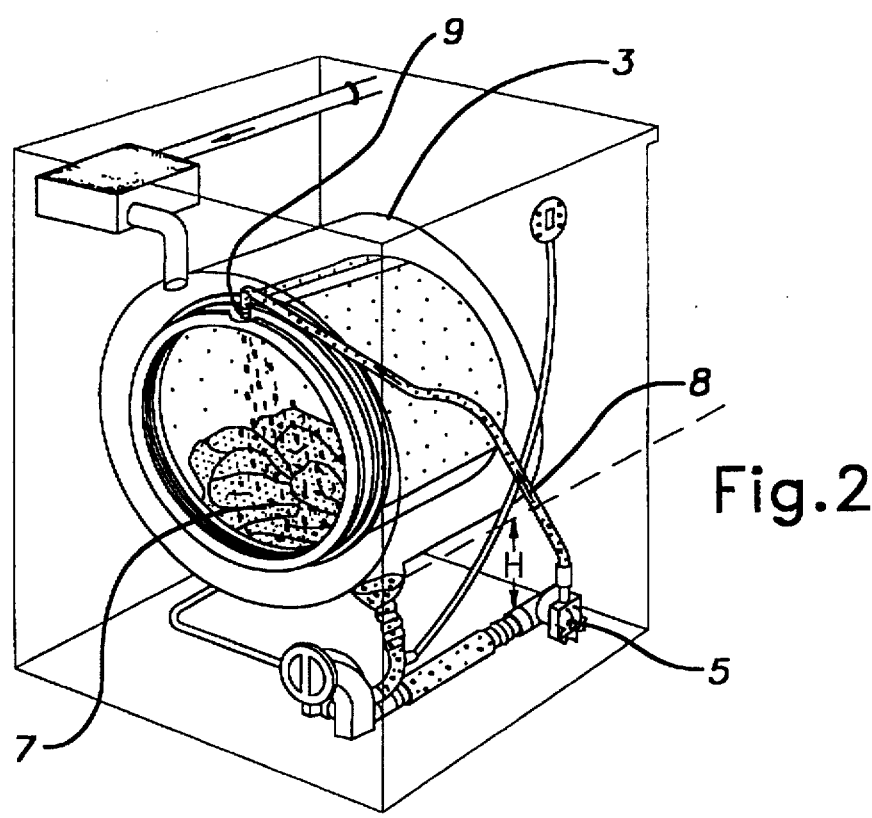

Throughout the following description, the term "water" is used in the same way and with the same meaning as the term "rinsing liquid." However, the use of either one or the other term will not affect the full intelligibility of is the description considering the context in which said terms are used, as anyone skilled in the art will be able to readily appreciate.

The invention is substantially based on the following considerations. The effectiveness of a rinsing process substantially depends on the removal of washing liquid from the washload, that is the dilution of the washing liquid in the rinsing water. If the rinsing effectiveness is to be improved, it is desirable to adjust the two factors that are influencing such a rinsing process, that is to increase either the amount of rinsing liquid or the number of rinsing phases or, ideally, both factors.

However, an increase of both said factors using fresh water from the mains in each rinse increases water usage, which on the contrary should be reduced as much as possible.

To this purpose, repeated use of the same rinsing liquid would appear to be a solution. However, such a liquid unavoidably becomes progressively contaminated by the preceding rinsing phases, so that the overall effectiveness of each one of the rinsing phases decreases progressively as the number of the times in which the rinsing liquid is reused increases.

It has, however, been demonstrated by experimentation that such an integral recycling of the rinsing liquid brings about a rinsing performance that is much better than that of a traditional rinsing process in which the washload is even just partially immersed in the fresh water bath. Thus, removal of detergent solution and, therefore, dilution of the residual detergent solution in the washload are improved.

Such a phenomenon can be quantitatively explained as follows. In a traditional rinsing process, the final dilution of the bath, which is normally discharged, does not appear to be equal to the dilution of the proportion of bath which is retained, due to capillary or other effects, by the washload. Even in the best rinsing cycle, the liquid is not able to permeate the whole of the washload bulk so as to therefore repeatedly replace the water molecules of the bath with the water molecules retained by the clothes.

In other words, the well-known effect of "retention" of a part of the detergent solution, or the pre-existing liquid in the clothes, occurs even if the clothes are fully immersed and agitated in a bath having a different, very low concentration of detergent solution.

The resulting bath after a rinsing phase is in all cases less concentrated than the liquid retained by the clothes, albeit slightly. Also, a new rinsing phase performed using the same rinsing liquid that has just been used in the preceding rinse brings about a further rinsing effect under removal of a part of the detergent solution, albeit to a quite modest extent. Thus, carrying out a new rinse with the same liquid progressively improves the overall rinsing performance since it increases the water substitution in the clothes.

This is a commonly known fact and the reason why there is a tendency to extend the duration of the rinses as much as possible as limited by the maximum acceptable duration of the whole wash process.

It is also common knowledge that the spin-extraction operation at the end of the rinse is instrumental in removing a considerable part of the liquid retained in the clothes due to capillary effect, or mechanical reasons, and therefore, removes a corresponding amount of detergent solution retained in the clothes. This enables the liquid used in the subsequent rinse to be contaminated to a lesser extent, with a better overall rinsing performance eventually.

Such an improvement, however, has a counter-effect in that it involves an increase in water usage. If it is true that in each rinse performed with fresh water the clothes are rinsed effectively, it is also true that the water used in each rinse is discharged from the machine when it is still only slightly contaminated. The end result is that water is wasted which could actually be reused for rinsing.

It is also common knowledge, and a common practice, to combine the utilization of the two above-cited effects, that is the removal of the detergent solution retained by the clothes through both a multiplication of the number of rinses and a mechanical removal of the detergent solution by spin-extraction at the end of each rinsing phase, in order to obtain the best possible result. As already pointed out, however, this calls for the utilization of successive fresh water fillings.

In order to eliminate the afore cited drawback of having to discharge water that is still relatively clean, it is possible for the same water to be used more than once by letting it flow, during the spin-extraction phases, into an appropriate recovery reservoir so as to allow for the tube to be entirely emptied for a correct spin-extraction effect.

In practice, in order to reduce the water usage, it is possible to make use of a predetermined amount of fresh water, which is then recovered almost entirely. To an extent corresponding to the maximum amount that can be extracted from the clothes after the first rinse, the water is reused in one or more subsequent rinsing phases.

In this manner, the concentration of contaminants, that is, detergent laden washing liquid, in the clothes is progressively reduced. As a consequence, the concentration thereof in the rinsing liquid is correspondingly increased, so that such values tend to approach each other in each subsequent rinsing phase carried out using the same rinsing liquid extracted from the clothes and then recovered.

A multiplication of the water usage due to the filling of successive amounts of fresh water is in this way avoided, while carrying out a plurality of rinsing phases and respective spin-extractions at the end thereof.

Such a process might conflict with the desire to avoid the necessity of providing a recovery reservoir of a significant size to be associated to the machine along with appropriate delivery and return conduits with related pumps and accessory parts, so that the resulting machine will unavoidably be excessively expensive and complicated.

The present invention teaches how the same result as described above can be obtained, that is, the utilization of a single rinsing bath that is used several times after related spin-extraction cycles, wherein the bath is first removed from the tub and subsequently poured again onto the clothes, without this requiring any use of a recovery reservoir, liquid conveyances from a vessel into another one, the use of corresponding pumps, etc.

The invention includes the utilization, in a recirculating-type machine, of certain volumes already available in the water-carrying circuit of the machine as a recovery reservoir of the above-mentioned type, without therefore any need arising for the structure of the same machine to undergo any modification.

The volumes utilized include: a portion of a tub 3, namely a portion of the tub that is situated underneath a lower edge 15 of a drum 12; and a conduit 1 that leads from the bottom 2 of the tub 3 to a filter 4 arranged underneath the tub and/or a recirculating pump 5, as illustrated schematically in FIGS. 1–4.

Such a machine is similar in its construction to a normal recirculating-type machine. The differences lie in the controller, the rinsing program implemented, and the utilization of a level control or pressure switch 6, as explained below.

At the beginning of a rinsing cycle, that is a first phase shown in FIG. 1, the machine fills in such an amount of fresh water as is capable of being entirely absorbed by the clothes 7. Then the machine interrupts the water inlet. It should be emphasized that a pre-determined amount of water is actually filled in in this phase, which is calculated to enable the washload to be entirely and thoroughly soaked with water. The water, however, does not necessarily immediately reach the clothes, since it can be left on the bottom of the tub until it is circulated by a corresponding recirculation circuit that includes a recirculation conduit 8.

Theoretically, the machine could fill in water to a level beyond such a limit. However, it is preferable and prudent for such a limit not to be exceeded so that after the clothes have been soaked in the above indicated manner, the upper level of the bath in the tub lies underneath said edge.

To ensure that the water is actually absorbed by the washload, a jet of water pumped by the recirculation pump 5 is sprayed onto the washload through an appropriate conduit 8 and a final nozzle 9 oriented towards the center of the tub. Subsequently, in a second phase shown in FIG. 2, the pump 5 is energized and the drum is driven to rotate at a low revolution speed so as to enable the entire washload to be wetted and soaked by the water filled into the machine. The water is recirculated by the pump and sprayed against the washload. During this second phase, the level of the liquid in the tub keeps lowering until it reaches down to a height H located just above the recirculating pump.

Figure 3:
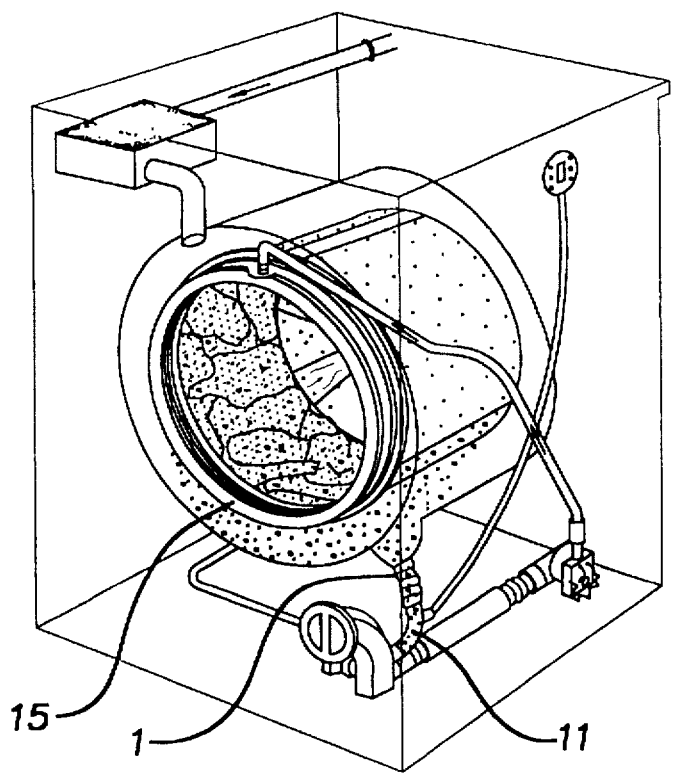
FIGS. 3 and 4 are schematical views of a third phase of spin-extraction and a repetition of the first water filling phase, respectively.

After a predetermined period, the drum is then driven so as to start rotating at a high revolution speed for a few minutes during a spin-extraction phase, as shown in FIG. 3. The purpose of this high-speed rotating operation of the drum is to rid the washload of most of the rinsing water and, as a result, the detergent solution washing liquid contained therein.

Figure 4:
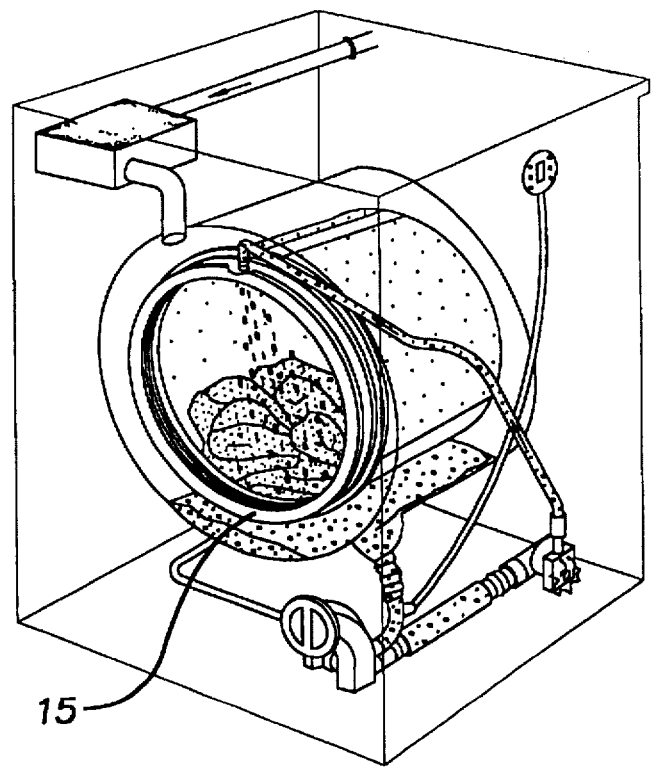

At the end of this third phase as shown in FIG. 4, the level of liquid in the tub remains below the lower edge 15 of the drum, thereby allowing for high-speed spin-extraction to be carried out without any interference from the collected water.

Therefore, substantially the same circumstances are encountered here as the ones prevailing at the beginning of the first phase so that the above described sequence of phases may be repeated any desired number of times.

Use is therefore made of the afore described rinsing opportunities. The same rinsing bath is reused following a spin-extraction cycle carried out, possibly using the highest revolution speed of the drum, at the end of each rinsing phase performed using the same liquid. A recovery reservoir and related accessory items for collecting the rinsing liquid are not required.

Evidence of the effectiveness of the present invention is, of course, provided by simply comparing the overall water usage values of a "regular" clothes washing machine and the same machine embodying the features according to the present invention. For example, such a comparison has been made on a machine produced by the applicant, Model ELECTROLUX EW 1550 F, capable of spinning at a revolution speed of 1500 rpm, with a washload of 5 kg.

All other conditions being equal, and in particular for the same rinsing performance, the actual water usage for the whole washing program has decreased from 54 liters to just 42 liters of fresh water, which is exactly the same water usage recorded for the same type of machine when specially provided with a reservoir for the recovery of the rinsing liquid.

The difference, in the case considered here, lies in the fact that the machine embodying the features of the present invention does not include any additional reservoir, which provides the desired advantages.

The invention enables a number of advantageous improvements to be obtained. One involves carrying out the first filling of fresh water for rinsing to such an amount as to ensure not only a full soaking effect of the washload in the drum, but also that a certain amount of water remains on the bottom of the tub after such a soaking.

The presence of the pressure sensor 6, in conjunction with an appropriate control circuitry 13, makes it possible for the level of the liquid in the tub to be continuously monitored. As soon as the level is detected to be approaching the lower edge 15 of the drum, a discharge pump 10 is started for a short period so as to eliminate any risk of interference that may rise between a spinning drum and the level of the liquid in the tub.

Using the discharge pump allows filling in an amount of fresh water that is slightly greater than the actual amount that would be selected theoretically in accordance with the program of the machine. This provides greater assurance that the whole washload is actually soaked, thereby improving the rinsing performance.

A second improvement provides for measuring the level of the liquid in the tub, after the first phase, in order to make sure that the liquid level is sufficient.

The measurement of such a level includes the height of the water column in the conduit 1 between the bottom of the tub and a pressure detection point 11 of the pressure sensor 6.

Should, in fact, such a level be detected to be insufficient, this would clearly indicate that the liquid has been totally absorbed and the washload has not been completely saturated with liquid, which would unavoidably lead to inadequate rinsing.

In order to avoid such a drawback, after the first spin-extraction phase, and preferably also after all of the subsequent spin-extraction phases with the same rinsing liquid, the level of the liquid is measured automatically. If, as already set forth above, this level is not found to be sufficient, a level restoring phase is automatically started, which includes letting additional fresh water into the tub until the level is sufficient.

Although the invention has been described using the example of preferred embodiments thereof and using a generally known terminology, it shall not be intended as being limited by these, since it will be appreciated that anyone skilled in the art may be able to use the teachings of this invention to devise any number of variants and modifications thereto. The appended claims shall therefore be intended as to include all such obvious modifications that are readily apparent to those skilled in the art and clearly fall within the scope of the present invention.

What is claimed is:

1. A clothes washing machine comprising an outer casing; a washing tub (3) in the casing; a cylindrically shaped perforated drum contained in the tub and adapted to rotate within said tub about an axis of the cylinder during washing and spin-extraction; a lower conduit (1) arranged below said tub, and connected to the bottom (2) of said tub; a spray nozzle (9) arranged to spray liquid into the tub; a delivery conduit (8) connected to the spray nozzle; a recirculating pump (5) provided to pump liquid contained in the lower conduit towards an interior of said drum through the delivery conduit (8) and spray nozzle (9); and a pressure sensor (6) connected to a bottom portion of the lower conduit (1) and adapted to determine a corresponding height of a column of liquid in the lower conduit, characterized in that the machine is provided with a controller that, in at least one rinsing cycle, operates the machine to:

(a) initially fill a predetermined amount of water into the tub;

(b) operate the recirculating pump for a definite period of time so as to enable the water to be fully pumped into the drum while the drum is started to rotate at a low revolution speed;

(c) start a spin-extraction cycle for a predetermined period of time so that a minimum level of extracted water is restored in the tub, wherein the water initially filled in as described under (a) is such an amount as to ensure that at the end of the spin-extraction phase described under (c), the level of the liquid in the tub remains constantly below the lower edge of said drum; and (d) start a further rinsing cycle to be performed in the same manner as defined under (a), (b) and (c) above.

2. A clothes washing machine according to claim 1, characterized in that the machine is adapted to perform the operations described under (a), (b) and (c) a predetermined number of times.

3. A clothes washing machine according to claim 2, characterized in that after the spin-extraction cycle according to (c), a partial emptying of the tub is provided so as to cause the level of the liquid contained therein to lower until the level is immediately below the lower edge of the drum.

4. A clothes washing machine according to claim 3, characterized in that after the spin-extraction cycle according to (c), the level of the column of liquid is measured by said pressure sensor (6) and, if lower than a pre-set minimum level, additional liquid is filled into the tub until the level of the column of liquid rises again to reach the pre-set minimum level.

5. A clothes washing machine according to claim 1, characterized in that after the spin-extraction cycle according to (c), the level of the column of liquid is measured by said pressure sensor (6) and, if lower than a pre-set minimum level, additional liquid is filled into the tub until the level of the column of liquid rises again to reach the pre-set minimum level.

6. A clothes washing machine according to claim 5, characterized in that after the spin-extraction cycle according to (c), a partial emptying of the tub is provided so as to cause the level of the liquid contained therein to lower until the level is immediately below the lower edge of the drum.

7. A clothes washing machine according to claim 2, characterized in that after the spin-extraction cycle according to (c), the level of the column of liquid is measured by said pressure sensor (6) and, if lower than a pre-set minimum level, additional liquid is filled into the tub until the level of the column of liquid rises again to reach the pre-set minimum level.

8. A clothes washing machine according to claim 1, characterized in that after the spin-extraction cycle according to (c), the level of the column of liquid is measured by said pressure sensor (6) and, if lower than a pre-set minimum level, additional liquid is filled into the tub until the level of the column of liquid rises again to reach the pre-set minimum level.

9. A process for operating a clothes washing machine having an outer casing; a washing tub (3) in the casing; a cylindrically shaped perforated drum contained in the tub and adapted to rotate within said tub about an axis of the cylinder during washing and spin-extraction; a lower conduit (1) arranged below said tub, and connected to the bottom (2) of said tub; a spray nozzle (9) arranged to spray liquid into the tub; a delivery conduit (8) connected to the spray nozzle; a recirculating pump (5) provided to pump liquid contained in the lower conduit towards an interior of the drum through the delivery conduit (8) and spray nozzle (9); and a pressure sensor (6) connected to a bottom portion of the lower conduit (1) and adapted to determine a corresponding height of a column of liquid in said lower conduit, characterized in that, in at least one rinsing cycle, the process comprises the steps of:

(a) initially filling a predetermined amount of water into the tub;

(b) operating the recirculating pump for a definite period of time so as to enable said water to be fully pumped into the drum while starting rotation of the drum at a low revolution speed;

(c) starting a spin-extraction cycle for a predetermined period of time so that a minimum level of extracted water is restored in the tub, wherein the water initially filled in as described under step (a) is such an amount as to ensure that at the end of the spin-extraction phase described under step (c), the level of the liquid in the tub remains constantly below the lower edge of said drum; and (d) starting a further rinsing cycle to be performed in the same manner as defined under steps (a), (b) and (c) above.

10. A process according to claim 9, characterized in that the steps (a), (b) and (c) are performed a predetermined number of times.

11. A process according to claim 10, characterized in that after the spin-extraction cycle according to step (c), the tub is partially emptied so as to cause the level of the liquid contained therein to lower until the level is immediately below the lower edge of the drum.

12. A process according to claim 11, characterized in that after the spin-extraction cycle according to step (c), the level of the column of liquid is measured by said pressure sensor (6) and, if lower than a pre-set minimum level, additional liquid is filled into the tub until the level of the column of liquid rises again to reach the preset minimum level.

13. A process according to claim 9, characterized in that after the spin-extraction cycle according to step (c), the level of the column of liquid is measured by said pressure sensor (6) and, if lower than a pre-set minimum level, additional liquid is filled into the tub until the level of the column of liquid rises again to reach the preset minimum level.

14. A process according to claim 13, characterized in that after the spin-extraction cycle according to step (c), the tub is partially emptied so as to cause the level of the liquid contained therein to lower until the level is immediately below the lower edge of the drum.

15. A process according to claim 10, characterized in that after the spin-extraction cycle according to step (c), the level of the column of liquid is measured by said pressure sensor (6) and, if lower than a pre-set minimum level, additional liquid is filled into the tub until the level of the column of liquid rises again to reach the pre-set minimum level.

16. A process according to claim 9, characterized in that after the spin-extraction cycle according to step (c), the level of the column of liquid is measured by said pressure sensor (6) and, if lower than a pre-set minimum level, additional liquid is filled into the tub until the level of the column of liquid rises again to reach the pre-set minimum level.

* * * * *

UNITED STATES PATENT AND TRADEMARK OFFICE
CERTIFICATE OF CORRECTION

PATENT NO. : 5,758,377
DATED : Jun. 2, 1998
INVENTOR(S) : Silvano Cimetta, et al It is certified that error appears in the above-identified patent and that said Letters Patent is hereby corrected as shown below:

Column 2, line 20, after "of" delete "is".

Column 6, line 59, (Claim 5, line 1), "1" should read --2-- line 66, (Claim 6, line 1), "5" should read --1--

Column 7, line 4, (Claim 7, line 1), "2" should read --6--

Column 8, line 21, (Claim 13, line 1), "9" should read --10-- line 27, (Claim 14, line 1), "13" should read --9-- line 31, (Claim 15, line 1), "10" should read --14--

Signed and Sealed this

Twenty-sixth Day of January, 1999

Attest:

Attesting Officer

*Acting Commissioner of Patents and Trademarks*